United States Patent
Raffaelli

(10) Patent No.: US 12,030,584 B2
(45) Date of Patent: Jul. 9, 2024

(54) MOTOR VEHICLE WITH ROLLING FORECARRIAGE AND REAR CARRIAGE WITH TWO DRIVING WHEELS

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 18/257,636

(22) PCT Filed: Dec. 16, 2021

(86) PCT No.: PCT/IB2021/061869
§ 371 (c)(1),
(2) Date: Jun. 15, 2023

(87) PCT Pub. No.: WO2022/130286
PCT Pub. Date: Jun. 23, 2022

(65) Prior Publication Data
US 2024/0043086 A1 Feb. 8, 2024

(30) Foreign Application Priority Data
Dec. 16, 2020 (IT) ......................... 102020000031109

(51) Int. Cl.
*B62K 5/10* (2013.01)
*B62K 5/027* (2013.01)

(52) U.S. Cl.
CPC ............... *B62K 5/10* (2013.01); *B62K 5/027* (2013.01)

(58) Field of Classification Search
CPC . B62K 5/10; B62K 5/027; B62K 5/06; B62K 2005/001; B60G 2300/45; B60G 2300/122
See application file for complete search history.

(56) References Cited

U.S. PATENT DOCUMENTS

| | | | |
|---|---|---|---|
| 4,666,018 A | 5/1987 | Shibuya | |
| 6,328,125 B1 * | 12/2001 | Van Den Brink | B62K 5/10 180/211 |
| 9,145,168 B2 * | 9/2015 | Spahl | B62K 5/10 |
| 10,513,291 B2 * | 12/2019 | Kato | B60G 7/001 |
| 11,117,636 B2 * | 9/2021 | Raffaelli | B62K 5/027 |
| 11,745,819 B2 * | 9/2023 | Schultz | B62D 37/00 180/216 |
| 11,794,844 B2 * | 10/2023 | Raffaelli | B62K 5/027 |
| 11,851,113 B2 * | 12/2023 | Hon | B62K 11/007 |
| 2006/0249921 A1 | 11/2006 | Patin et al. | |

FOREIGN PATENT DOCUMENTS

| | | |
|---|---|---|
| EP | 1070658 A1 | 1/2001 |
| EP | 1403171 A1 | 3/2004 |
| JP | S60183280 A | 9/1985 |
| WO | 2019123205 A1 | 6/2019 |
| WO | 2020117042 A1 | 6/2020 |

* cited by examiner

*Primary Examiner* — Amy R Weisberg
*Assistant Examiner* — Tiffany L Webb
(74) *Attorney, Agent, or Firm* — McGlew and Tuttle, P.C.

(57) ABSTRACT

The motor vehicle (1) includes a rolling forecarriage (3) and a non-rolling rear carriage (5). The forecarriage is connected to the rear carriage by a linkage system (23) that includes a four-bar linkage defining a roll axis that remains in a fixed position and on the supporting surface (S) of the motor vehicle (1) when the motor vehicle performs a roll movement.

12 Claims, 14 Drawing Sheets

MOTOR VEHICLE WITH ROLLING FORECARRIAGE AND REAR CARRIAGE WITH TWO DRIVING WHEELS

TECHNICAL FIELD

The present invention relates to improvements to motor vehicles comprising a rolling forecarriage and a non-rolling rear carriage, on which the rear driving wheels are mounted.

Background Art

Over the years, different types of vehicles have been developed, in particular for transporting goods, comprising a rolling, i.e., tilting, forecarriage and a rear carriage formed by a carriage with a pair of driving wheels, which is not subjected to roll movements, i.e., in which the driving wheels remain in a plane orthogonal to the plane of forward movement of the motor vehicle, and a mechanism for connection between forecarriage and rear carriage.

An example of a vehicle of this type is disclosed in U.S. Pat. No. 4,666,018. In this prior art vehicle, the connection between rolling forecarriage and non-rolling rear carriage is obtained by means of a joint that has a rotation axis with a top-down inclination in front-rear direction with respect to the direction of forward movement of the vehicle. This prior art vehicle has some drawbacks. In particular, when the forecarriage rotates with respect to the rear part of the vehicle about the axis of the joint, in addition to a roll movement, a yaw movement, i.e. of rotation of the vehicle about a vertical median axis, also occurs.

In some rolling vehicles, the roll axis is not on the ground on which the vehicle rests and moves forward. In this case, even if the roll axis is horizontal, i.e., parallel to the ground, which prevents the occurrence of a yaw movement when the vehicle performs a roll movement, a pitch movement occurs as the forecarriage tends to lower.

To reduce the problems of this vehicle, EP1070658 discloses a vehicle with rolling forecarriage and non-rolling rear carriage, which comprises a linkage system for connection between the forecarriage and the rear carriage. The linkage system is formed by a four-bar linkage in the shape of isosceles trapezoid, with two cross members of different length and two uprights of the same length. The forecarriage is pivoted to the lower cross member, of shorter length, while the rear carriage is integral with the upper cross member, of greater length. The roll movement of the forecarriage is permitted by the deformation of the four-bar linkage.

This known mechanism allows the roll axis of the forecarriage to be taken to the level of the ground on which the vehicle moves forward, or even below the level of the ground. If the roll axis is horizontal, yaw movements are avoided. However, the roll axis does not remain in a fixed position. Therefore, even if when the vehicle is erect (zero roll axis) the roll axis is on the ground, i.e., on the road surface, when the vehicle carries out roll movements (non-zero roll angle) the roll axis describes a curve that moves it both with respect to the road surface and with respect to longitudinal vertical median plane of the vehicle. In other terms, the roll axis does not remain on the centerline of the vehicle. These displacements do not allow elimination of the pitch movement that accompanies roll movement. Moreover, when the axes of the hinges of the four-bar linkage are inclined with respect to the road surface, a yaw movement of the forecarriage with respect to the rear carriage is added to the inevitable pitch movement.

Therefore, there is still a need to improve the structure of vehicles with a rolling forecarriage and non-rolling rear carriage to avoid or reduce the drawbacks of prior art vehicles.

SUMMARY OF THE INVENTION

According to an aspect, to minimize the drawbacks of the prior art a motor vehicle is provided, which comprises: a rolling forecarriage; a rear carriage having two non-rolling rear driving wheels; and a linkage system for connection between the rolling forecarriage and the rear carriage. The linkage system comprises a four-bar linkage and more precisely an articulated parallelogram.

In embodiments, the linkage system comprises: a left upright (also indicated as left rocker arm), pivoted to the rear carriage about a left lower pivot axis; a right upright (also indicated as right rocker arm) pivoted to the rear carriage about a right lower pivot axis; an upper cross member, pivoted in an upper point of the left upright about a left upper pivot axis and in an upper point of the right upright about a right upper pivot axis.

The linkage system further comprises an intermediate cross member, hinged to the left upright about a left intermediate pivot axis arranged between the left lower pivot axis and the left upper pivot axis and hinged to the right upright about a right intermediate pivot axis arranged between the right lower pivot axis and the right upper pivot axis.

The intermediate cross member is hinged to the forecarriage about a lower central pivot axis and the upper cross member is hinged to the forecarriage about an upper central pivot axis. The distance between the lower central pivot axis and the upper central pivot axis is substantially the same as the distance between the left intermediate pivot axis and the left upper pivot axis and as the distance between the right intermediate pivot axis and the right upper pivot axis. In an erect and non-rolling position of the vehicle on a supporting surface, the lower central pivot axis is located below a plane on which the left intermediate pivot axis and the right intermediate pivot axis lie and the pivot axes of the linkage system lie on vertical planes parallel to a vertical median plane of the motor vehicle, on which the lower central pivot axis and the upper central pivot axis lie.

In practice, the uprights or rocker arms and the two cross members, in addition to an element that is stationary with respect to the rear carriage and to which the two uprights are pivoted, form a triple four-bar linkage, and more precisely a triple articulated parallelogram, wherein the rolling forecarriage is pivoted to the two cross members whereof that are movable with respect to the rear carriage, the linkage for connection between forecarriage and articulated parallelogram being defined by the two central pivot axes, parallel to each other and to the axes of the four-bar linkage.

Further advantageous features and embodiments of the motor vehicle are described below and defined in the appended claims, which form an integral part of the present description.

In the present description the term "horizontal" generally refers to a direction parallel to the supporting surface of the motor vehicle, for example a road surface. The term "vertical" refers to a direction orthogonal to the supporting surface.

DETAILED DESCRIPTION

Hereunder embodiments will be described with reference to the accompanying drawings. Those skilled in the art will understand that the embodiments described are non-limiting examples of the invention.

In the accompanying figures, the arrows U, D indicate a vertical "up-down" direction, the arrows L, R indicate a transverse "left-right" direction, and the arrows F, B, indicate a "front-back" direction. In the description and in the appended claims the terms "right" and "left" refer to the right and left sides with respect to a driver in a driving position on the vehicle. The definition "vertical" indicates a position orthogonal to the ground or to a supporting surface of the vehicle in stationary and erect position, i.e., not inclined about the roll axis. Unless otherwise indicated, the definitions "below", "above", "upper", "lower", "intermediate" referring to positions of members or parts of the vehicle relate to the vehicle in an erect and stationary, non-inclined position, on a supporting or ground surface.

A first embodiment of a vehicle according to the present invention is illustrated in FIGS. 1 to 10.

Figure 1:
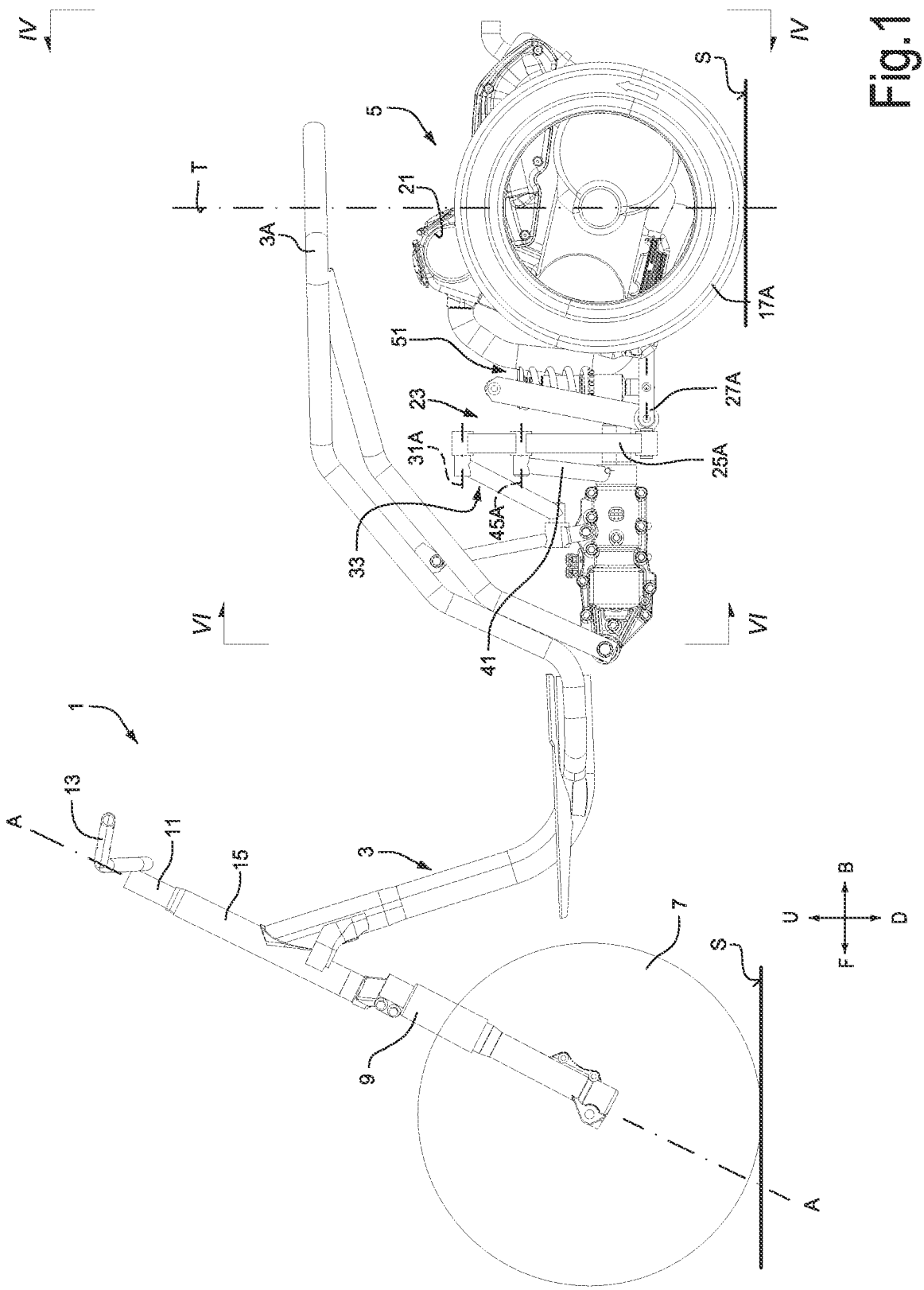
FIG. 1 shows a side view of a vehicle in a first embodiment and in erect position, i.e. with a zero roll angle.
Figure 2:
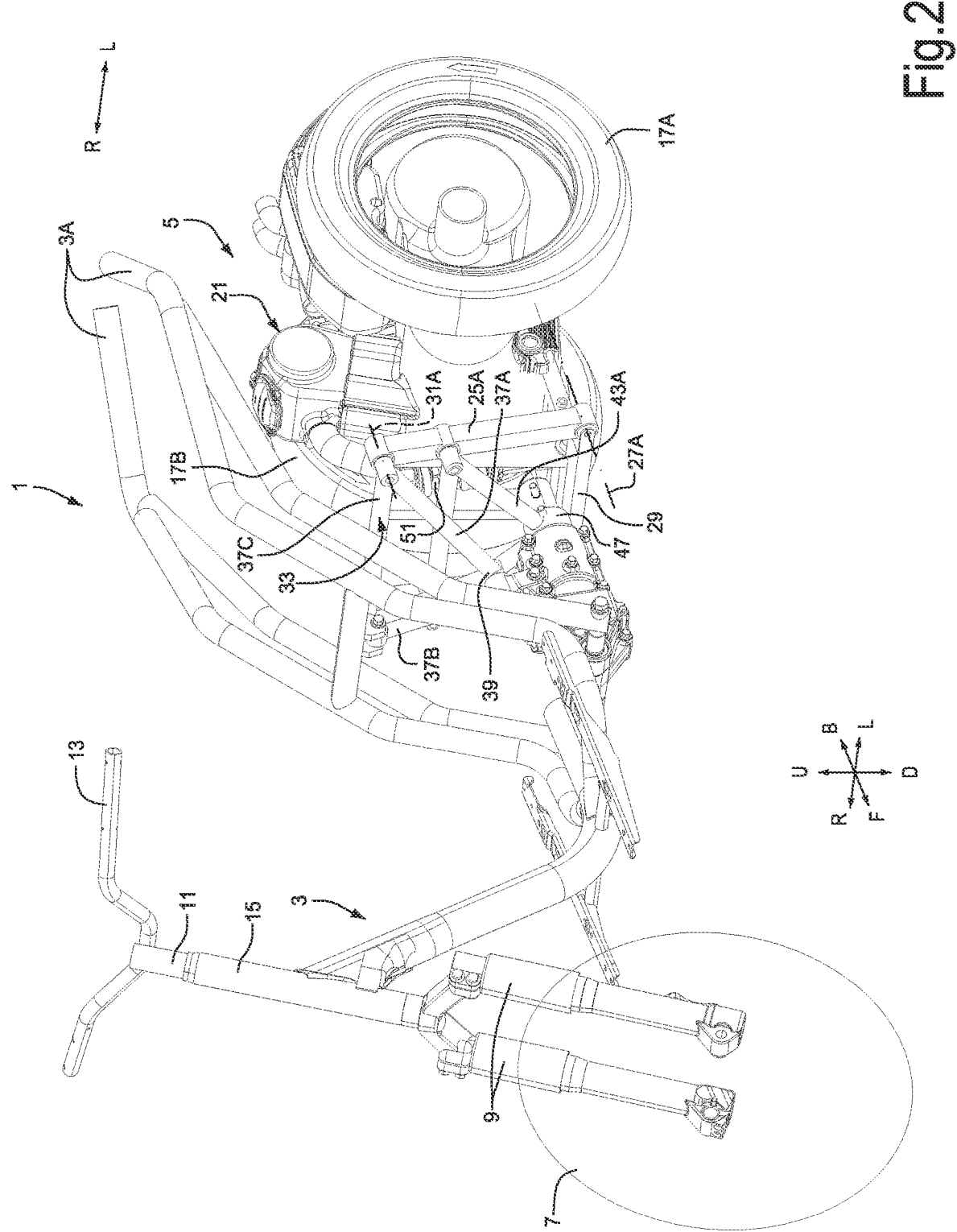
FIGS. 2 and 3 show axonometric views of the vehicle of FIG. 1.
Figure 3:
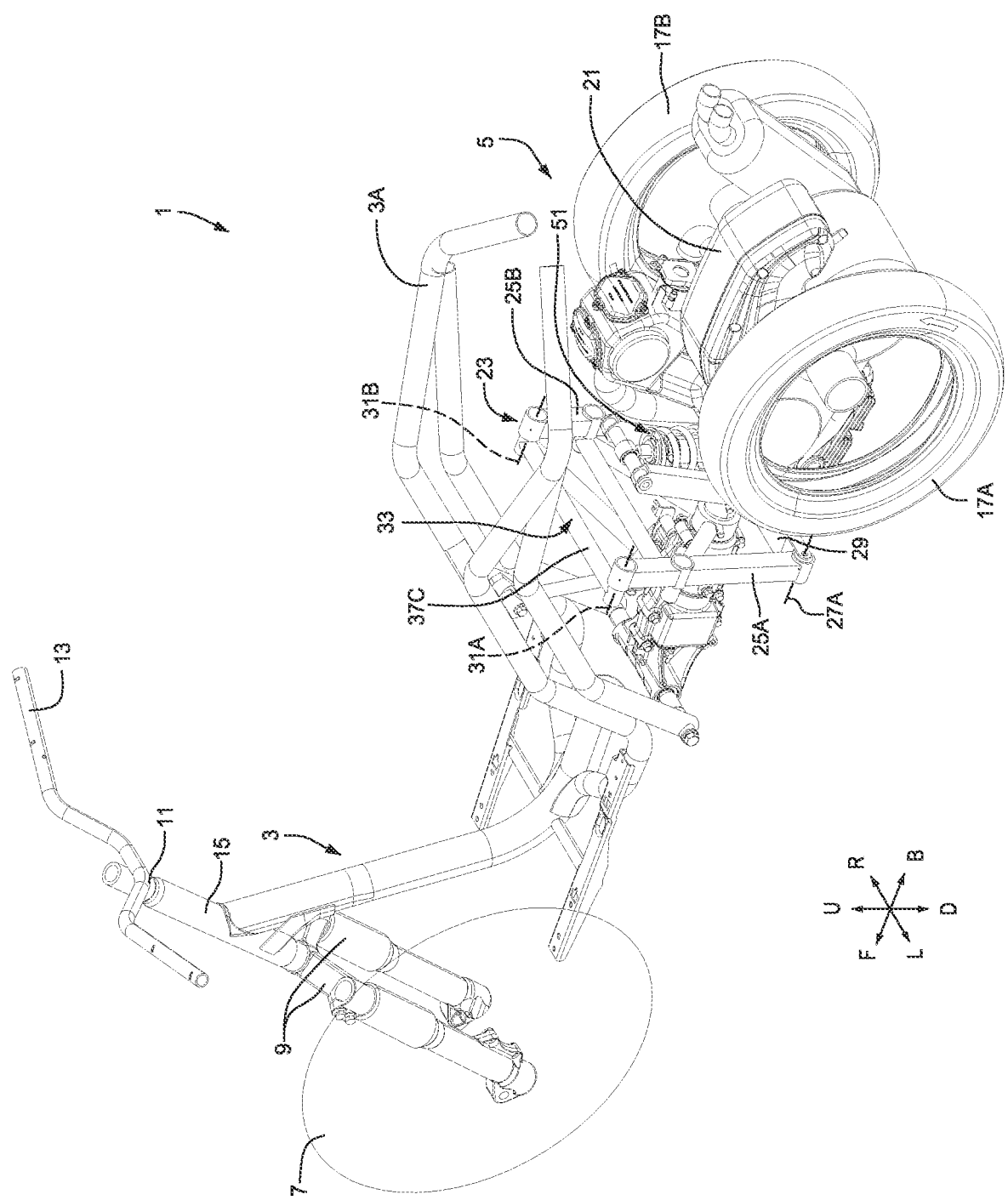
Figure 4:
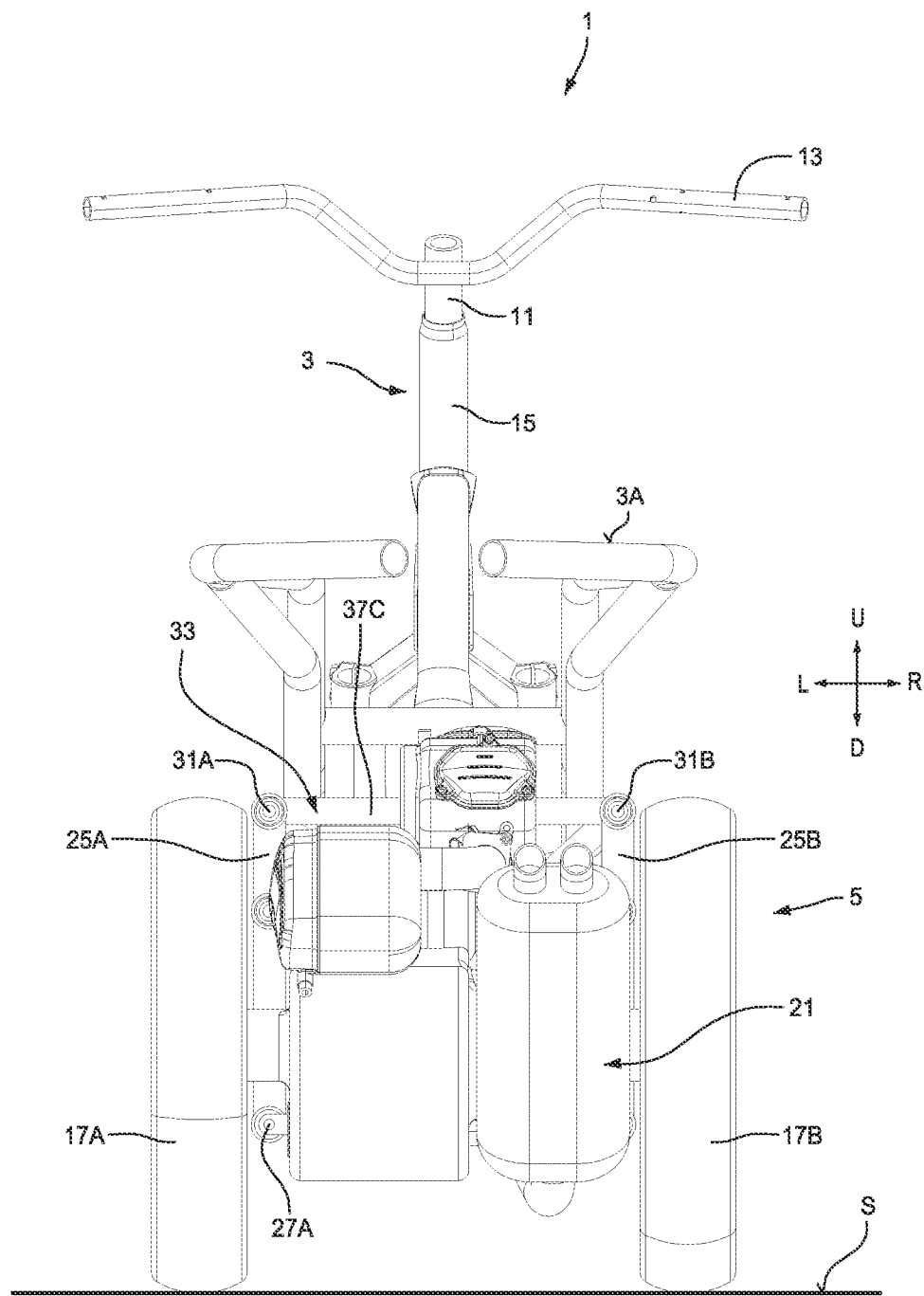
FIG. 4 shows a rear view according to IV-IV of FIG. 1.

The vehicle 1 comprises a forecarriage 3 and a rear carriage 5. The forecarriage 3 comprises a front steered wheel 7 constrained, for example through telescoping forks 9, to a steering column 11, integral with a handlebar 13 and accommodated rotatably in a steering tube 15 to rotate about a steering axis A-A (FIG. 1).

The forecarriage 3 can be integral with a frame that extends toward the rear part of the vehicle, until it is above the rear carriage 5. The rear part of the frame integral with the forecarriage 3 is indicated with 3A. The saddle of the vehicle (not shown) and a container for the load can be fixed on the rear part 3A. Alternatively, by providing a shorter rear part 3A of the frame, a container containing the load can be arranged on the rear carriage 5. In the first case there is the advantage of the load rolling together with the forecarriage of the vehicle, making driving more stable.

The rear carriage 5 comprises a left rear driving wheel 17A and a right rear driving wheel 17B. The rear driving wheels 17A, 17B receive their motion from an motor 21, for example an internal combustion engine. However, it would also be possible to provide the vehicle 1 with an electric motor, or with two electric motors, associated with the two rear driving wheels 17A, 17B.

Figure 6:
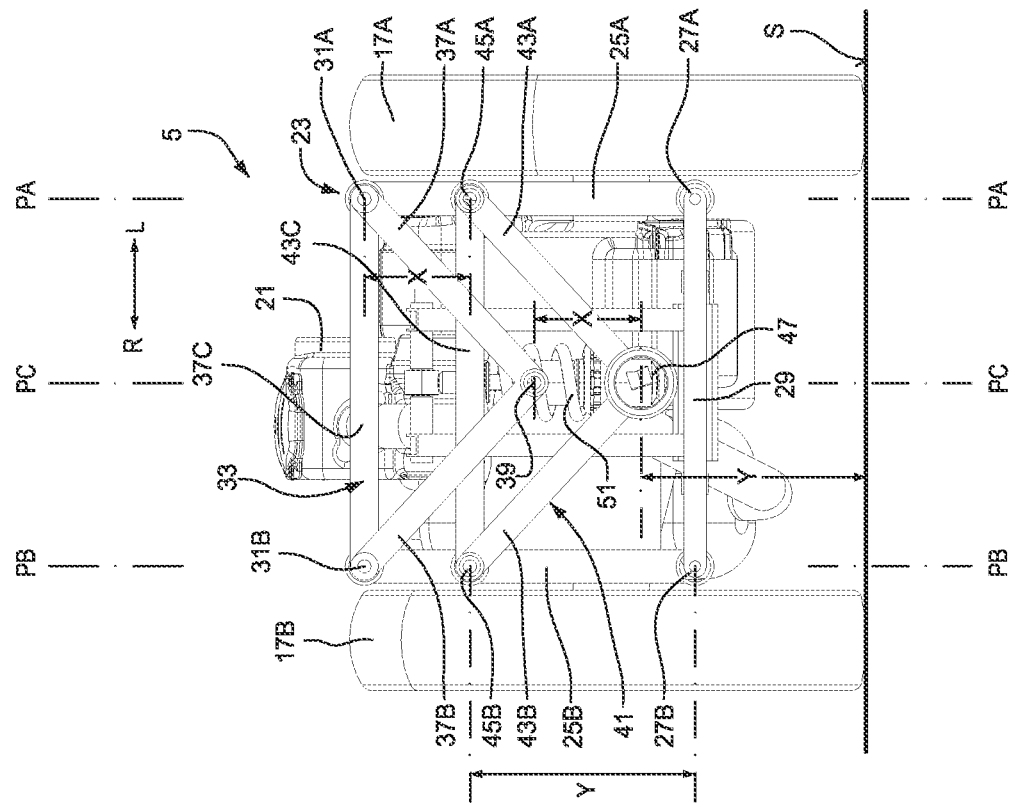
FIG. 6 shows a section according to VI-VI of FIG. 1.
Figure 5:
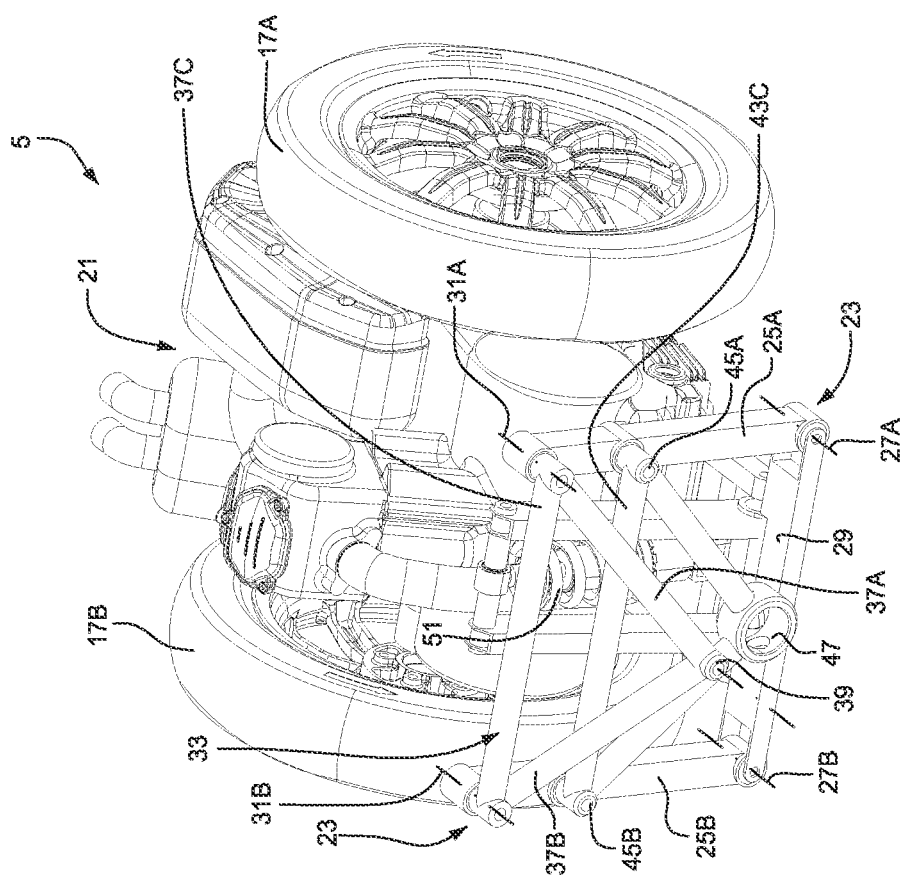
FIG. 5 shows an axonometric view of the rear part (rear carriage) of the vehicle of FIGS. 1 to 4.
Figure 7:
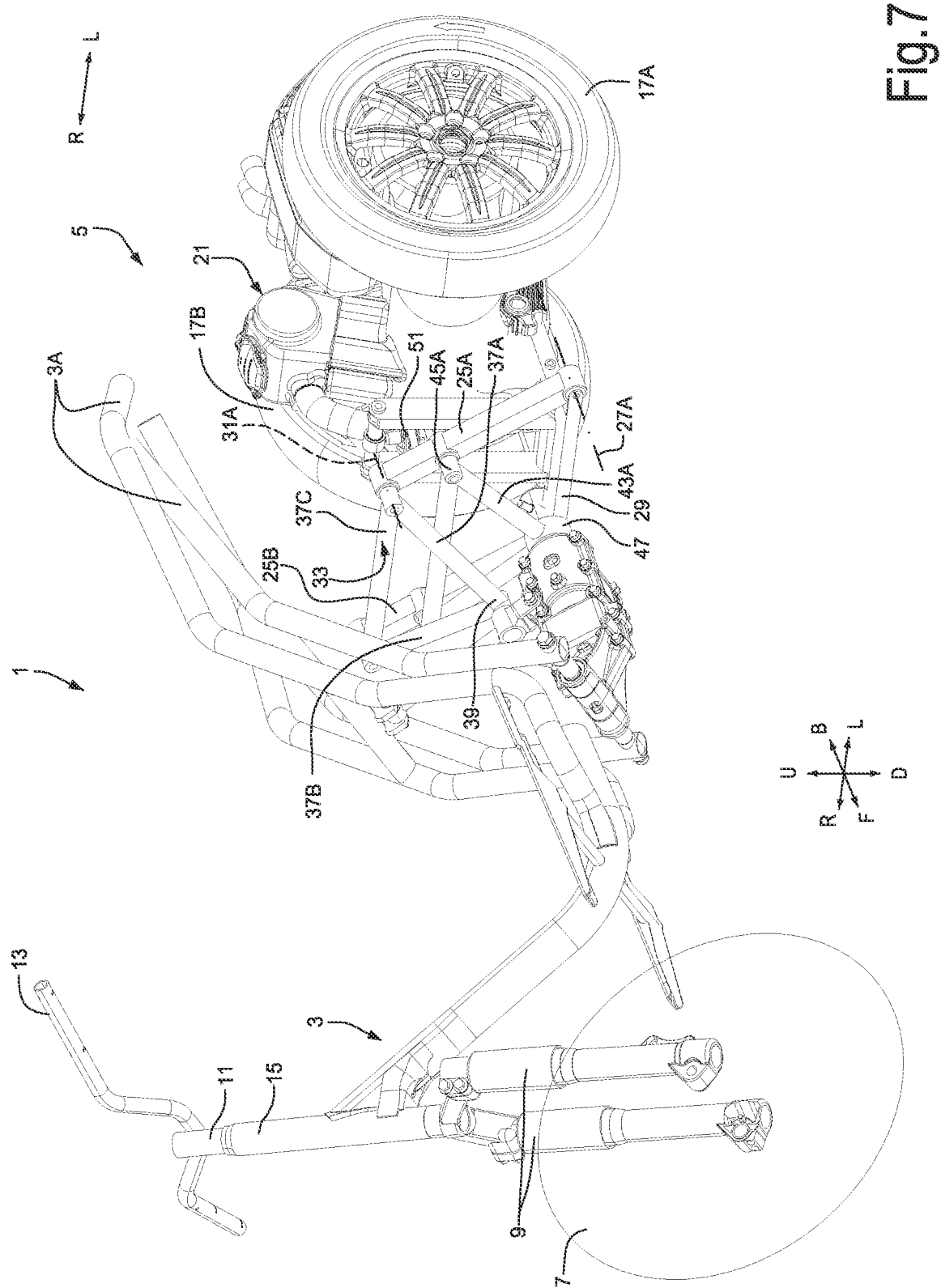
FIG. 7 shows an axonometric view of the vehicle of FIGS. 1 to 6 in a position with forecarriage inclined, i.e. with a non-zero roll angle.
Figure 8:
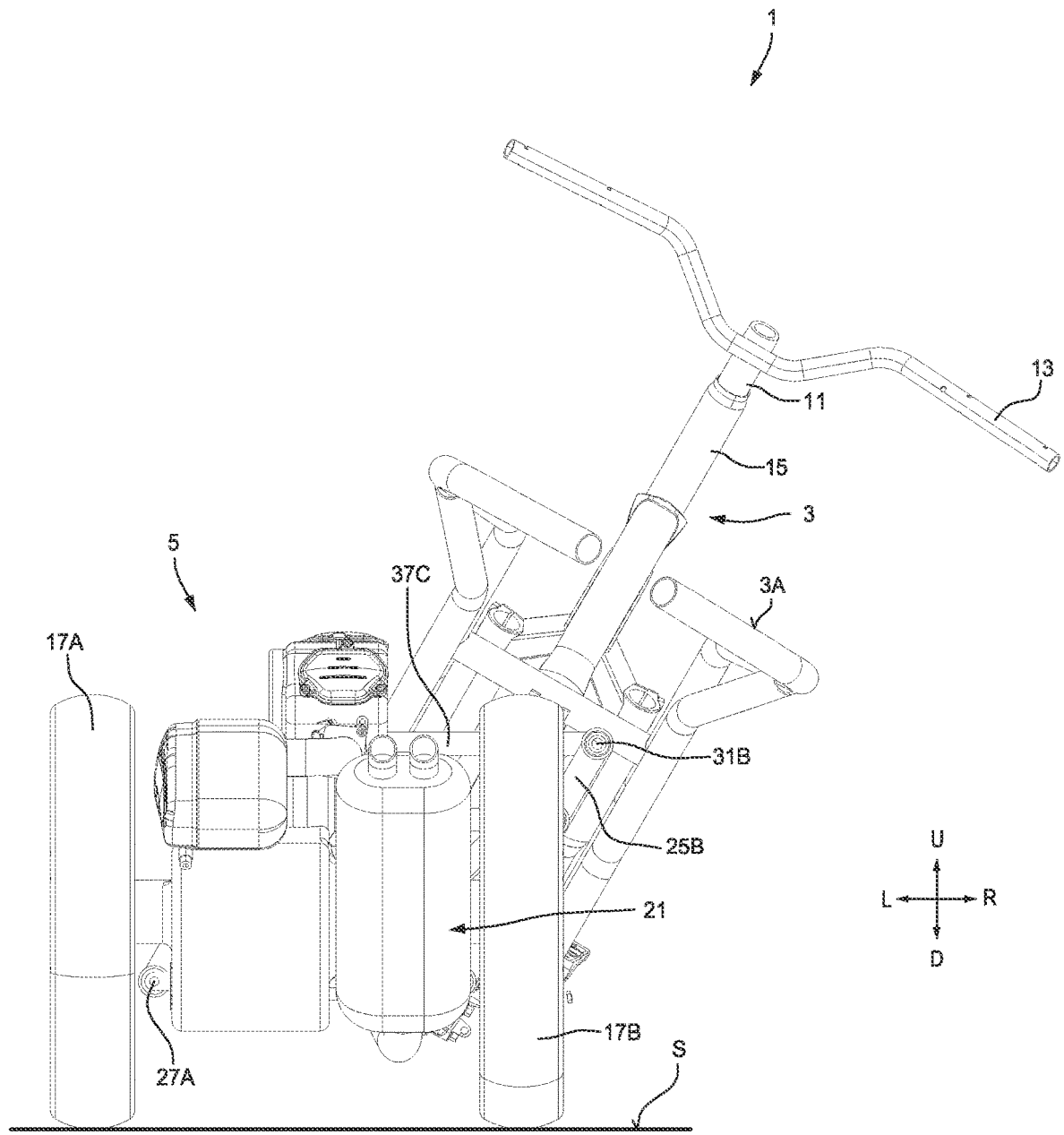
FIG. 8 shows a rear view analogous to FIG. 4, with the vehicle inclined as in FIG. 7.
Figure 10A:
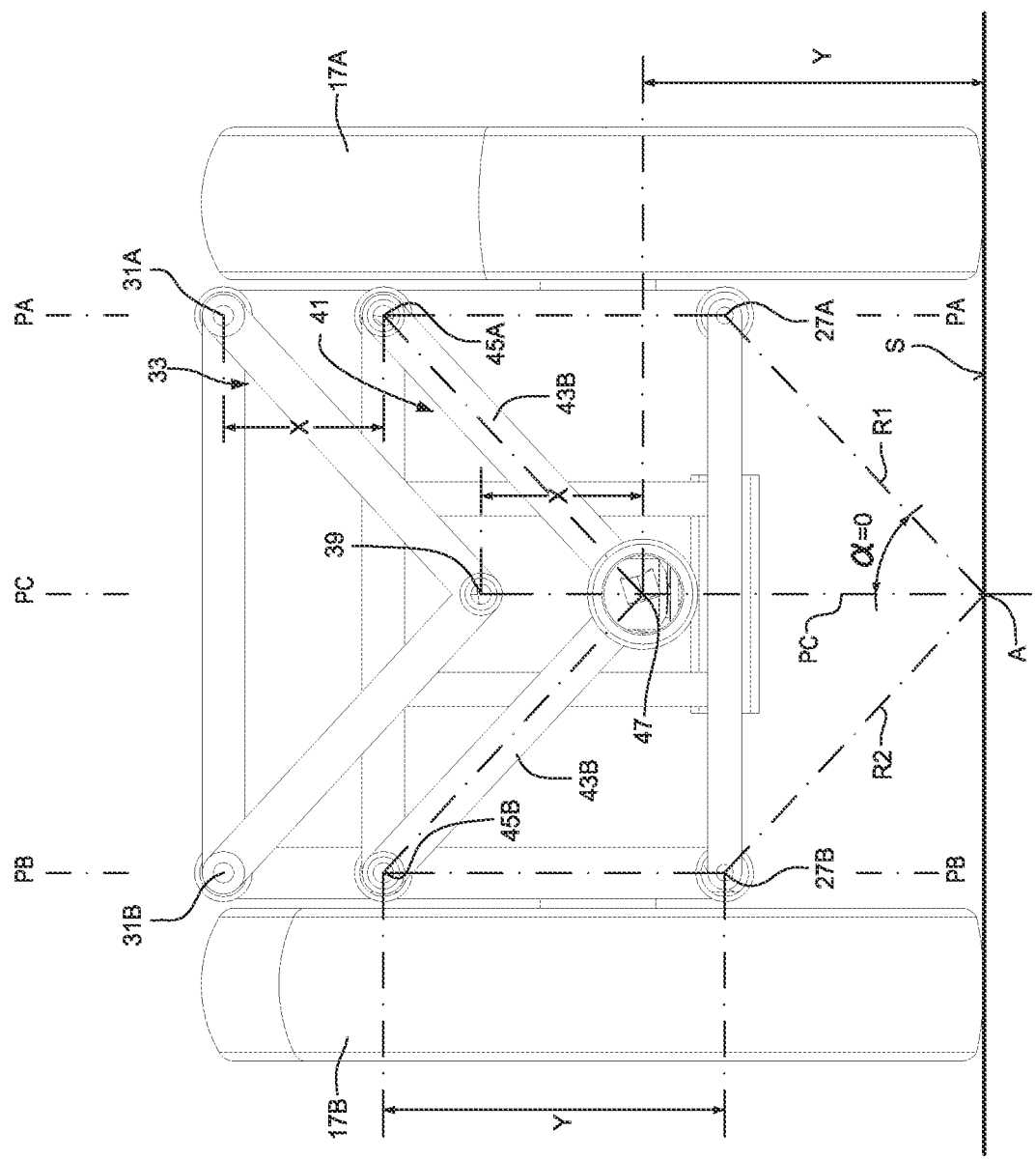
FIGS. 10A and 10B show simplified representations of the sections of FIGS. 6 and 9.
Figure 10B:
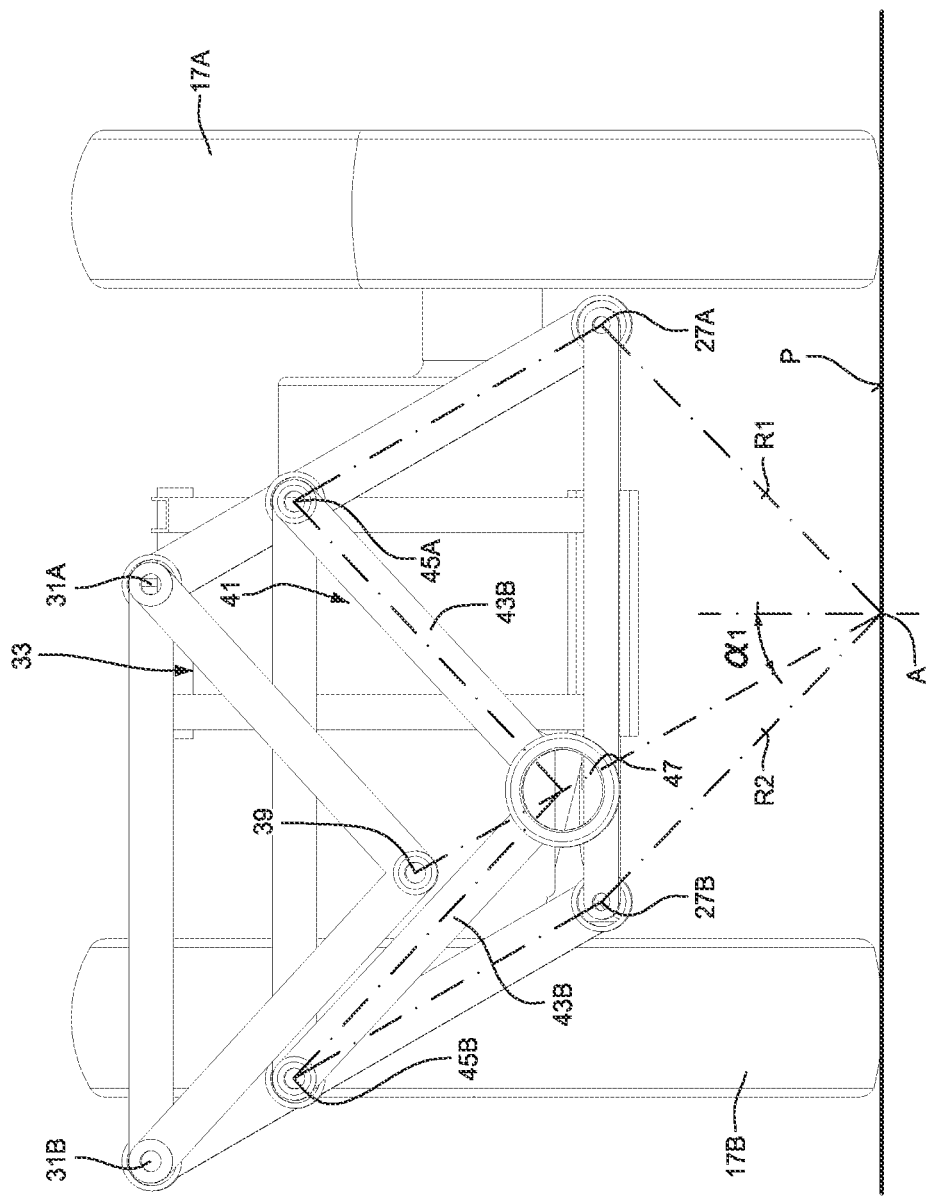

The forecarriage 3 is connected to the rear carriage 5 by means of a linkage system 23, visible in particular in FIGS. 5 and 6 and simplified in FIGS. 10A, 10B. In the illustrated embodiment, the linkage system 23 comprises a left upright or left rocker arm 25A and a right upright or right rocker arm 25B. The left upright 25A is pivoted to the carriage 5 about a hinge that defines a left lower pivot axis 27A, while the right upright 25B is pivoted to the carriage 5 about a hinge that defines a right lower pivot axis 27B. In the illustrated embodiment, the hinges that define the right and left lower pivot axes 27A, 27B are integral with a lower cross member 29 of the linkage system 23.

The left upright, or left rocker arm, 25A is also pivoted to an upper cross member 33 by means of a hinge that defines a left upper pivot axis 31A. Likewise, the right upright, or right rocker arm, 25B is pivoted to the upper cross member 33 by means of a hinge that defines a right upper pivot axis 31B. The left 27A, 31A and right 27B, 31B pivot axes are parallel to one another and each lie in a vertical plane. The left upright 25A and the right upright 25B are parallel to one another, in the sense that the pivot axes 27A, 31A lie on a plane parallel to the plane on which the pivot axes 27B, 31B lie.

In the illustrated example, the right and left pivot axes 27A, 27B, 31A, 31B are parallel to the front-back direction identified by the arrows F, B, i.e., are parallel to the direction of travel of the motor vehicle 1 when it travels along a straight line.

The left pivot axes 27A, 31A are coplanar to each other on a plane that, when the vehicle is stationary and not inclined, i.e., with a zero roll angle, is vertical, i.e., orthogonal to the supporting surface S (FIGS. 4, 6) of the vehicle 1. The plane is indicated with PA in FIGS. 6 and 10A. The left and right upper pivot axes 31A, 31B are coplanar and lie on a plane parallel to the ground, i.e., to the supporting surface S of the vehicle 1. Likewise, the right pivot axes 27B, 31B are coplanar to each other on a plane (indicated with PB in FIGS. 6 and 10A) parallel to the plane PA on which the left pivot axes 27A, 31A lie. The pivot axes 27A, 27B are coplanar and lie on a plane parallel to the plane on which the pivot axes 31A, 31B lie. The supporting surface S, which can correspond to the ground or road surface on which the motor vehicle 1 rests, is in practice the geometric plane that passes tangent to the wheels of the motor vehicle 1.

In the present context, the references 27A, 27B, 31A, 31B and other references used below to indicate a pivot axis are also used to indicate the respective hinges that define these axes. For example, the reference number 27A indicates both the left pivot axis between the lower cross member 29 and the left upright 25A, and the hinge that connects the lower cross member 29 and the left upright 25A to each other.

The right and left uprights 25B, 25A, the lower cross member 29 and the upper cross member 33 with the respective hinges define a four-bar linkage. In the illustrated embodiment, the four-bar linkage 25A, 25B, 29, 33 is rectangular in shape (with the vehicle erect and a zero roll angle, FIG. 6).

The upper cross member 33 has the shape of an isosceles triangle, with a base extending from the left upper pivot axis 31A to the right upper pivot axis 31B and with a vertex facing downward.

In the illustrated embodiment, the upper cross member 33 is formed by three linear elements, and more precisely: a base element 37C extending in left-right direction (L-R) between the upper pivot hinges 31A, 31B; a left side element 37A; and a right side element 37B. The side elements 37A, 37B converge in the vertex of the isosceles triangle defined by the upper cross member 33. The vertex defines an upper central hinge axis 39, by means of which the forecarriage 3 is connected to the rear carriage 5. The upper central hinge 39 defines an upper central pivot axis that, following the nomenclature and numbering defined above for the hinges already described, is also indicated with the same reference number 39.

In other embodiments, the base element 37C could be omitted. However, it provides greater stiffness to the upper cross member 33.

As shown in particular once again in FIGS. 5 and 6, the linkage system 23 further comprises an intermediate cross member 41 also in the shape of isosceles triangle, with a left side element 43A and a right side element 43B. The left side element 43A is pivoted by means of a left intermediate hinge 45A to the left upright in an intermediate position between the lower left hinge 27A and the upper left hinge 31A. Likewise, the right side element 43B is pivoted, by means of a right intermediate hinge 45B, to the right upright 25B, in an intermedia position between the right lower hinge 27B and the right upper hinge 31B. Therefore, the base of the isosceles triangle defining the intermediate cross member 41 has a base extending from the left intermediate hinge 45A to the right intermediate hinge 45B. The two side elements 43A, 43B converge towards the vertex of the isosceles triangle, where a central lower hinge 47 is formed, defining a lower central pivot axis that connects the rear carriage 5 to the forecarriage 3. The upper central pivot axis 39 and the lower central pivot axis 47 are parallel to the pivot axes that connect the uprights 25A, 25B, the lower cross member 29 and the upper cross member 33 to one another. In a position with the vehicle at rest, erect and with a zero a roll angle (FIGS. 5, 6) the central upper and lower pivot axes 39, 47 lie on the vertical median plane of the vehicle 1, indicated with PC in FIGS. 6 and 10A.

In the illustrated example, when the vehicle 1 is in erect position, with zero roll angle (vehicle not rolled), the left intermediate pivot axis 45A is on the vertical plane containing the left upper pivot axis 31A and the left lower pivot axis 27A, while the intermediate pivot axis 45B is on the vertical plane containing the right upper pivot axis 31B and the right lower pivot axis 27B. The lower central pivot axis 47 and the upper central pivot axis 39 lie on the vertical median plane of the motor vehicle 1.

In the illustrated embodiment, the intermediate cross member 41 comprises, in addition to the left and right side elements 43A, 43B, also a base element 43C, parallel to the base element 37C and to the lower cross member 29, which provides greater stiffness to the intermediate cross member 41.

As can be seen in FIG. 6, the lower central hinge 47 and the pivot axis defined thereby are placed at a lower height with respect to the upper central pivot hinge 39 and the respective upper central pivot axis defined thereby. Moreover, the lower central pivot axis 47 is located below the plane on which the left pivot axis 45A and the right pivot axis 45B, with which the intermediate cross member 41 is pivoted respectively to the left upright 25A and to the right upright 25B, lie. In the illustrated example, also the upper central pivot axis 39 is located below the plane on which the left pivot axis 45A and the right pivot axis 45B lie.

The shape of the upper cross member 33 and of the intermediate cross member 41 are the same, in the sense that the mutual distance of the vertices of the triangles defined by the pivot axes 31A, 31B, 39 for the upper cross member 33 and by the pivot axes 45A, 45B, 47 for the lower cross member 33 are the same. The distance X in vertical direction (FIG. 6) between the upper 39 and lower 47 central pivot axes is the same as the distance in vertical direction between the pivot axes 31A and or 31B and 45B.

Moreover, the linkage system 23 is configured so that the distance Y (i.e., the distance from the supporting surface S of the vehicle 1) of the lower central pivot axis 47 is equal to the distance Y between the pivot axes 45B and 27B, or 45A and 27A.

As can be seen in particular in FIGS. 10A and 10B, the linkage system 23 thus configured in substance defines a triple four-bar linkage and more in particular a triple articulated parallelogram, comprising the two uprights 25A, 25B and three cross members, namely: the intermediate cross member 41, the upper cross member 33 and the lower cross member 29. The forecarriage is pivoted to the upper cross member and to the intermediate cross member and can perform a roll movement with respect to the carriage 5. The lower cross member 29 is fixed with respect to the rear carriage 5. The vertex indicated with A, in which straight lines R1 and R2, passing respectively through the left lower pivot axis 27A and through the right lower pivot axis 27B and parallel to the side elements 43A, 43B (i.e. to the sides converging toward the lower central pivot axis 47 of the isosceles triangle whose base extends between the intermediate pivot axes 45A, 45B), converge, always remains on the vertical median plane of the vehicle 1 being part of the cross member 29, which is stationary with respect to the rear carriage 5. The vertex A is the trace of the roll axis of the forecarriage 3 of the vehicle 1.

Preferably, in the illustrated embodiment, the point A is located on the supporting surface S of the motor vehicle 1. The roll axis, parallel to the axes of the hinges of the linkage system 23, is preferably parallel to the supporting surface S.

It follows that, with the linkage system 23 described above, the roll axis always remains approximately in the same position and on the ground (surface S), for any angle of inclination of the forecarriage, hence with any roll angle of the forecarriage (equal to 0° in FIG. 10A and equal to a in FIG. 10B). Therefore, with respect to the linkage systems of the prior art, all the drawbacks deriving from the shift of the roll axis when the roll angle of the vehicle varies are eliminated, and in the particular configuration described the advantage of taking the roll axis to ground level is also achieved.

Figure 9:
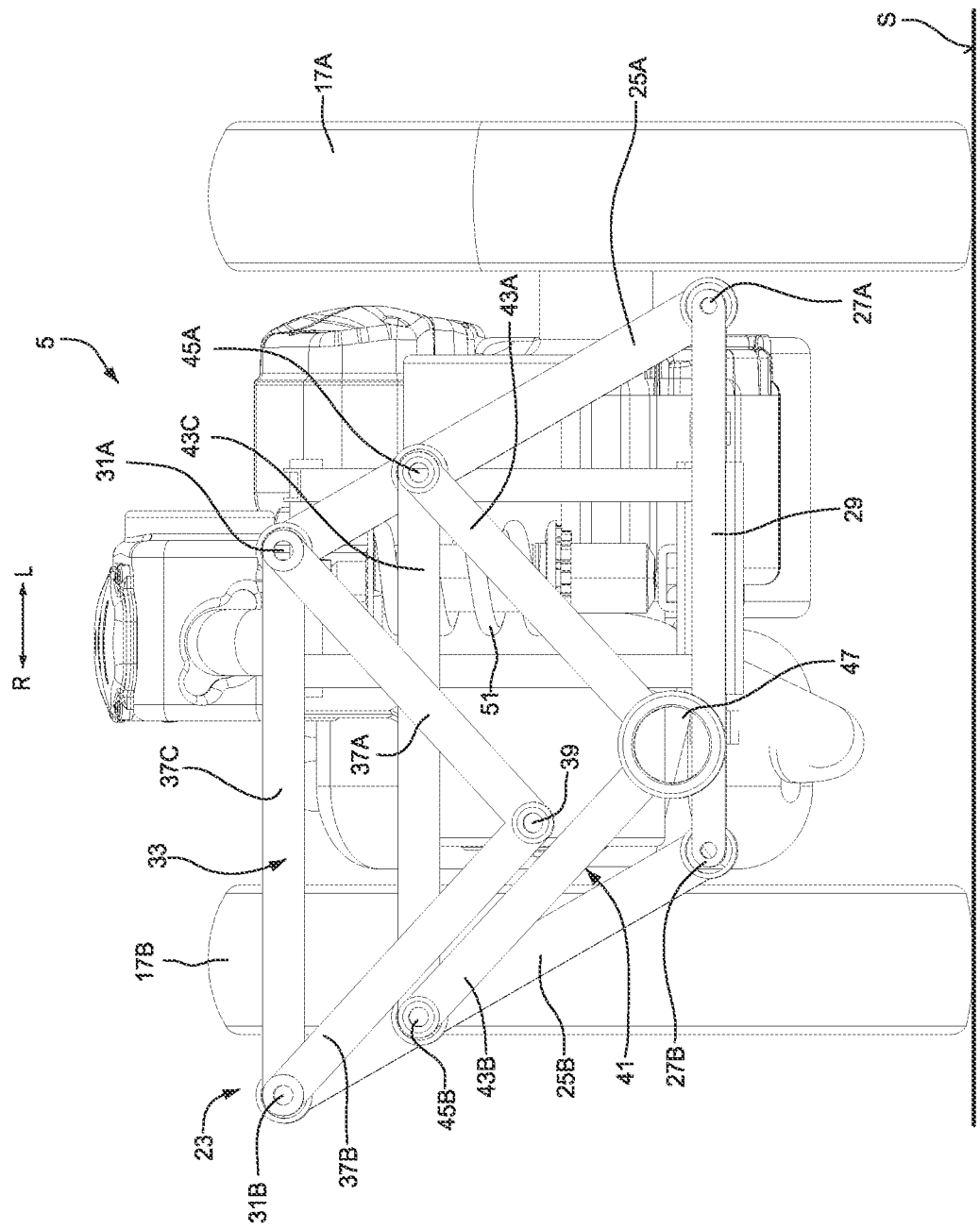
FIG. 9 shows a section analogous to the section of FIG. 6, with the forecarriage of the vehicle inclined as in FIG. 7.

The vehicle 1 of FIGS. 1 to 9 comprises, in addition to the components described above, also a suspension 51, visible in particular in FIGS. 1, 6 and 9.

In this embodiment, the suspension 51, which can comprise a spring and a shock absorber, is placed between the linkage system 23 and the assembly comprising the engine 21 and the rear driving wheels 17A, 17B. Therefore, in this case the linkage system 23 forms part of the sprung mass of the vehicle, while the rear carriage 5 with the engine 21 and the rear driving wheels 17A, 17B form part of the unsprung mass.

Figure 11:
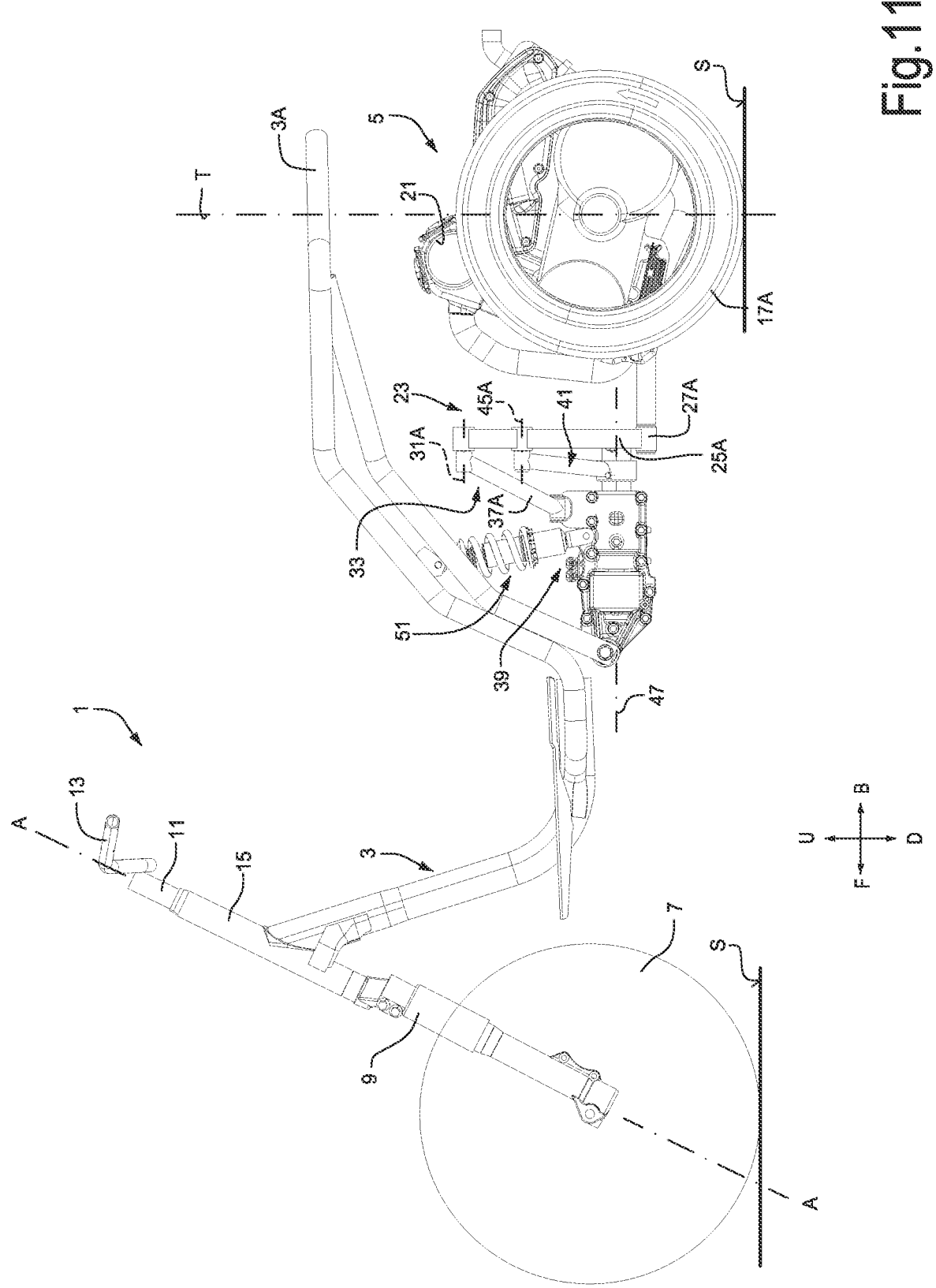
FIG. 11 shows a side view analogous to FIG. 1 of a vehicle in a further embodiment, in erect, i.e., non rolled, position.
Figure 12:
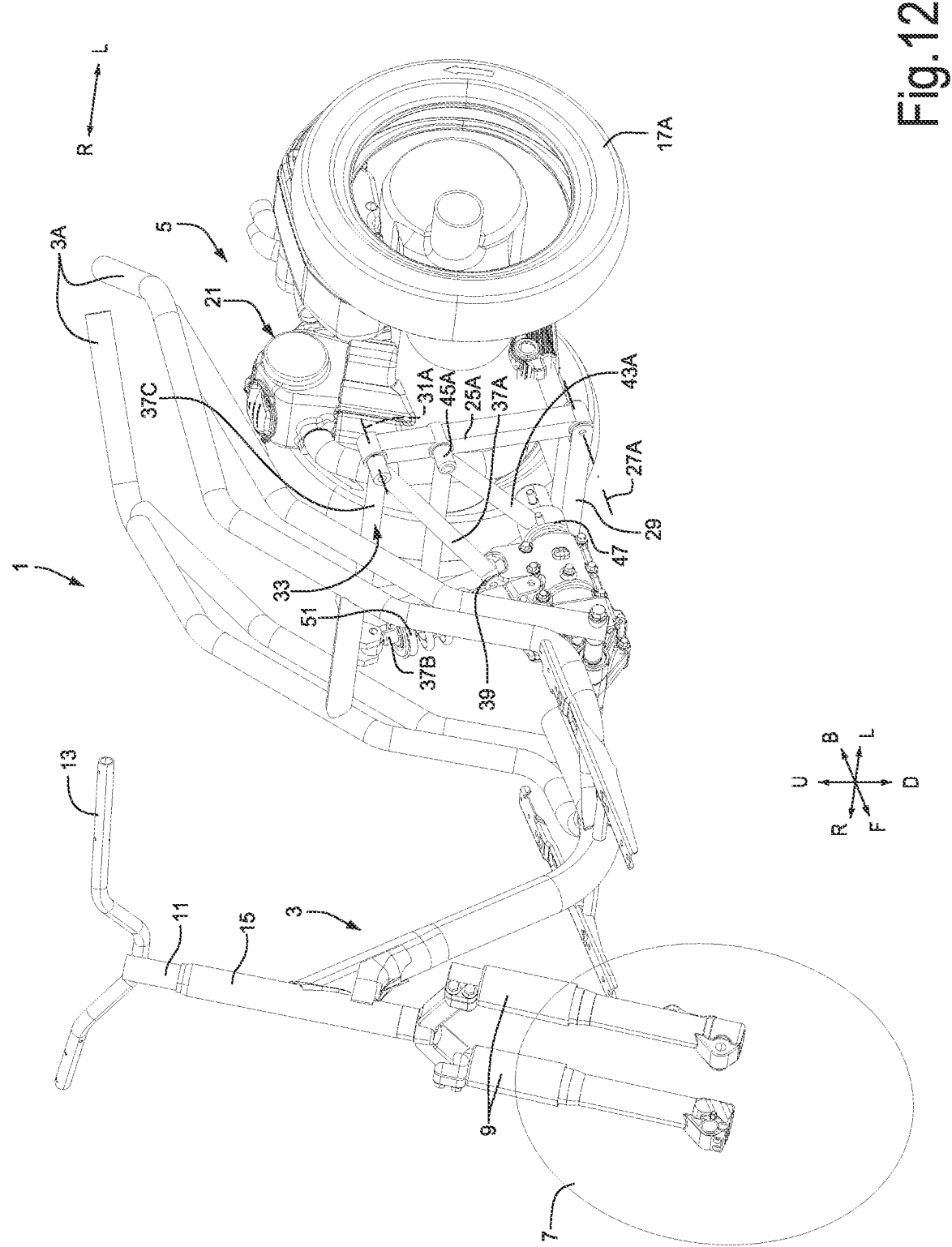
FIGS. 12 and 13 show axonometric views of the vehicle of FIG. 11.
Figure 13:
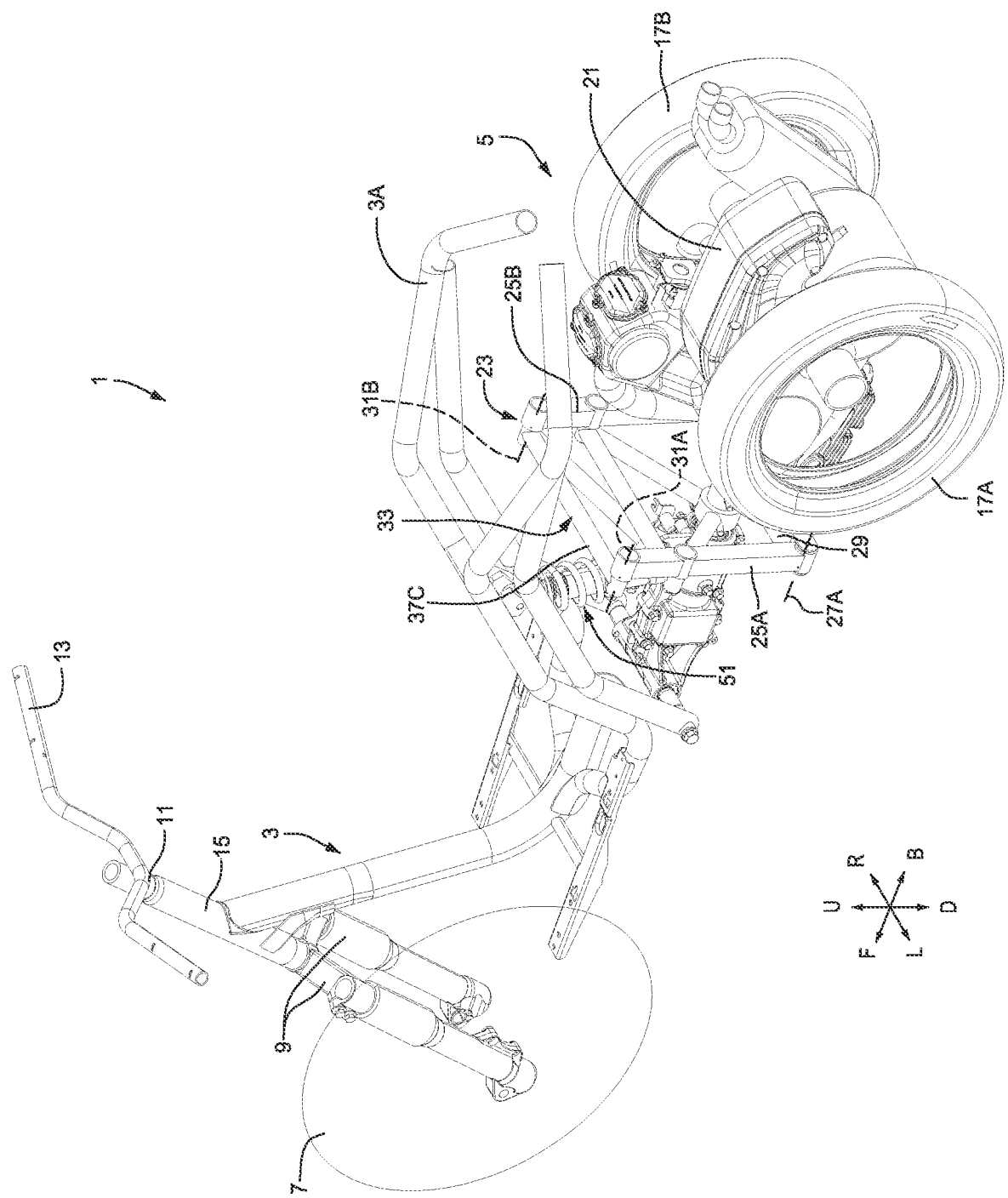
Figure 14:
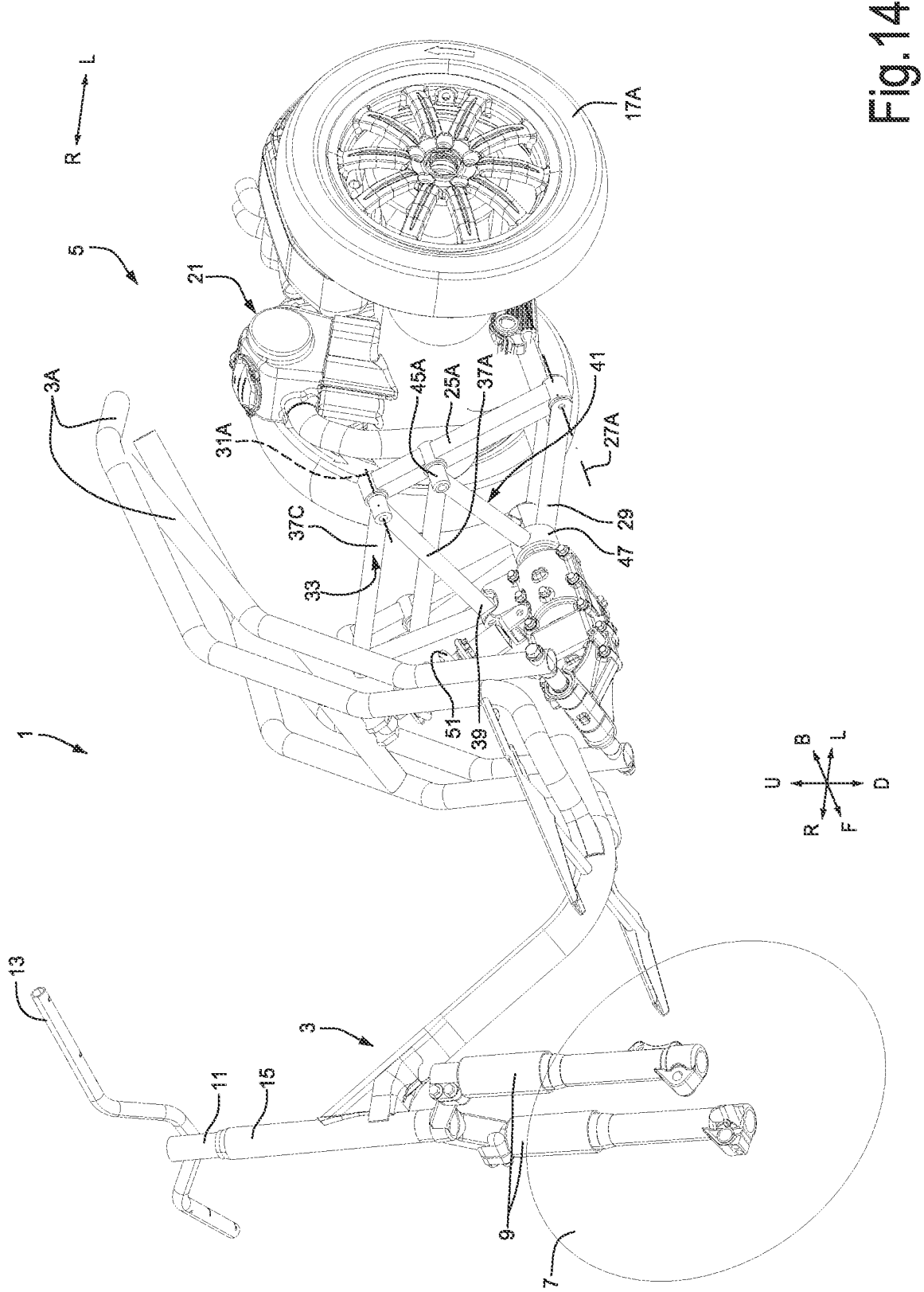
FIG. 14 shows an axonometric view of the vehicle of FIG. 11 in inclined position, i.e., with the forecarriage inclined with a non-zero roll angle.

FIGS. 11 a 14 show a further embodiment of the motor vehicle 1, in which the same or equivalent elements to those already described are indicated with the same reference numbers and will not be described in detail again. The embodiment of FIGS. 11 to 14 differs with respect to the embodiment of FIGS. 1 to 10 mainly due to the different arrangement of the suspension, also indicated with 51. In this case, the suspension 51 is positioned in front of the linkage system 23. In this case the linkage system 23 is part of the unsprung mass.

In the diagrams of the accompanying figures the rotation axes of the hinges that connect the various components of the linkage system 23 (in particular the axes 27A, 27B, 31A, 31B, 45A, 45B, 39 and 47) are parallel to the supporting surface, i.e., to the road surface S on which the vehicle 1 is located. This condition is preferred, as in this way the roll axis (trace A) is also on the plane S and remains on this plane and on the centerline of the motor vehicle 1 regardless of the roll angle by which the forecarriage 3 is inclined rotating about this axis.

This eliminates both the pitch movement and the yaw movement that, in other rolling vehicles of this type, are generated when the motor vehicle performs a roll movement.

However, it would also be possible to arrange the pivot axes of the linkage system and the central pivot axes 39 and 47 inclined with respect to the supporting surface S, instead of parallel thereto.

In this case, the roll axis will also be inclined with respect to the supporting surface S. Preferably, the inclination will be such that the roll axis passes through the straight line of intersection between the supporting surface S and the transverse plane orthogonal to the supporting surface S and containing the rotation axes of the rear driving wheels 17A, 17B. This transverse plane is indicated with T in FIGS. 1 and 11.

In this configuration, the motor vehicle 1 will not be subjected to pitch movements concurrent to the roll movement, but only to a yaw movement, which will decrease in proportion to the decrease in the inclination of the pivot axes 27A, 27B, 45B, 31A, 31B and of the axes 39 and 47 with respect to the supporting surface S of the motor vehicle.

Typically, if the rotation axes of the linkage system are inclined with respect to the road surface S, they can be configured so that the intersection between the rotation axis of the roll movement intersects the road surface S at a transverse plane, orthogonal to the surface S and passing through the centers of the rear driving wheels 17A, 17B.

Besides the advantages mentioned above, of reducing or eliminating the yaw movement and the pitch movement concurrent to the roll movement, the configuration of the vehicle described herein, with the roll axis placed on the supporting surface (road surface) of the vehicle, allows further advantages with respect to prior art vehicles in which the roll axis is placed above the supporting surface of the vehicle. These advantages are obtained, in particular, when the load of the vehicle is integral with the rolling frame. In fact, in this case the roll axis is taken to ground level as in the exemplary embodiment described above, the arc followed by the load in the roll movement has a larger radius with respect to the radius it would have if the roll axis were raised off the ground. This allows the plane of the load to be lowered, taking it closer to the rear wheels, without the risk of the load plane interfering with the rear wheels in vehicle rolled conditions. In this way the load capacity of the vehicle is increased, without raising its center of gravity.

What is claimed is:

1. A motor vehicle comprising:
   a forecarriage rolling about a roll axis;
   a rear carriage having two non-rolling rear driving wheels;
   a linkage system for connection between the rolling forecarriage and the rear carriage;
   wherein the linkage system comprises:
   a left upright pivoted to the rear carriage about a left lower pivot axis;
   a right upright pivoted to the rear carriage about a right lower pivot axis;
   an upper cross member, pivoted in an upper point of the left upright about a left upper pivot axis, and pivoted in an upper point of the right upright about a right upper pivot axis;
   an intermediate cross member, pivoted to the left upright about a left intermediate pivot axis arranged between the left lower pivot axis and the left upper pivot axis; and pivoted to the right upright about a right intermediate pivot axis arranged between the right lower pivot axis and the right upper pivot axis wherein the intermediate cross member is hinged to the forecarriage about a lower central pivot axis and the upper cross member is hinged to the forecarriage about an upper central pivot axis;
   wherein the distance between the lower central pivot axis and the upper central pivot axis is approximately equal to the distance between the left intermediate pivot axis and the left upper pivot axis and to the distance between the right intermediate pivot axis and the right upper pivot axis;
   wherein, in an erect and non-rolling position of the vehicle on a supporting surface, the lower central pivot axis lies under a plane on which the left intermediate pivot axis and the right intermediate pivot axis lie, and the pivot axes of the linkage system lie on vertical planes parallel to a vertical median plane of the motor vehicle, on which the lower central pivot axis and the upper central pivot axis lie.

2. The motor vehicle of claim 1, wherein the left upright and the right upright are parallel to each other, and the upper cross member and the intermediate cross member are parallel to each other.

3. The motor vehicle of claim 1, wherein in the non-rolling erect position of the vehicle on a supporting surface, the distance of the lower central pivot axis from the supporting surface is approximately equal to the distance between the left lower pivot axis and the left intermediate pivot axis, and to the distance between the right lower pivot axis and the right intermediate pivot axis.

4. The motor vehicle of claim 1, wherein in the non-rolling erect position of the vehicle on a supporting surface the upper central pivot axis is positioned under the plane on which the right intermediate pivot axis and the left intermediate pivot axis lie.

5. The motor vehicle of claim 1, wherein the left upright and the right upright are pivoted to the rear carriage at a left end and a right end of a lower cross member.

6. The motor vehicle of claim 1, wherein the left intermediate pivot axis, the right intermediate pivot axis and the lower central pivot axis are placed on the vertices of a first isosceles triangle, the base of which extends from the left intermediate pivot axis to the right intermediate pivot axis; and wherein the left upper pivot axis, the right upper pivot axis and the upper central pivot axis are placed on the vertices of a second isosceles triangle, equal to the first isosceles triangle, the base of which extends from the left upper pivot axis to the right upper pivot axis.

7. The motor vehicle of claim 6, wherein the left lower pivot axis, the right lower pivot axis and a point of intersection between a first straight line passing through and orthogonal to the left lower pivot axis and a second straight line passing through and orthogonal to the right lower pivot axis, the first straight line and the second straight line being respectively parallel to a first side of the first isosceles triangle and of the second isosceles triangle lie on the vertices of a third isosceles triangle, equal to the first isosceles triangle and to the second isosceles triangle, the roll axis of the motor vehicle being parallel to the lower central pivot axis and to the upper central pivot axis and passing through said point of intersection.

8. The motor vehicle of claim 7, wherein the point of intersection lies approximately on the supporting surface of the motor vehicle.

9. The motor vehicle of claim 7, wherein the point of intersection lies on a vertical median plane of the motor vehicle regardless of a roll angle of the motor vehicle.

10. The motor vehicle of claim 1, wherein the left lower pivot axis, the right lower pivot axis, the left upper pivot axis, the right upper pivot axis, the left intermediate pivot axis, the right intermediate pivot axis, the lower central pivot axis and the upper central pivot axis are substantially parallel to one another.

11. The motor vehicle of claim 10, wherein the left lower pivot axis, the right lower pivot axis, the left upper pivot axis, the right upper pivot axis, the left intermediate pivot axis, the right intermediate pivot axis, the lower central pivot axis and the upper central pivot axis are substantially parallel to the supporting surface of the motor vehicle, the roll axis preferably being on the supporting surface of the motor vehicle.

12. The motor vehicle of claim 10, wherein the left lower pivot axis, the right lower pivot axis, the left upper pivot axis, the right upper pivot axis, the left intermediate pivot axis, the right intermediate pivot axis, the lower central pivot axis and the upper central pivot axis are inclined with respect to the supporting surface of the motor vehicle, so that the roll axis intersects the supporting surface of the motor vehicle approximately at the intersection between the supporting surface and a transverse plane, orthogonal to the supporting surface and containing rotation axes of the rear driving wheels.

\* \* \* \* \*